US011200222B2

(12) United States Patent
Sen et al.

(10) Patent No.: US 11,200,222 B2
(45) Date of Patent: Dec. 14, 2021

(54) NATURAL LANGUAGE INTERFACE DATABASES

(71) Applicant: International Business Machines Corporation, Armonk, NY (US)

(72) Inventors: Jaydeep Sen, Bangalore (IN); Diptikalyan Saha, Bangalore (IN); Karthik Sankaranarayanan, Bangalore (IN); Ashish Mittal, Bengaluru (IN); Manasa Jammi, Kharagpur (IN)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 16/393,090

(22) Filed: Apr. 24, 2019

(65) Prior Publication Data
US 2020/0341964 A1  Oct. 29, 2020

(51) Int. Cl.
*G06F 16/23* (2019.01)
*G06F 16/2455* (2019.01)
*G06F 16/242* (2019.01)
*G06F 16/2452* (2019.01)

(52) U.S. Cl.
CPC ........ *G06F 16/2365* (2019.01); *G06F 16/243* (2019.01); *G06F 16/24522* (2019.01); *G06F 16/24553* (2019.01)

(58) Field of Classification Search
CPC .............. G06F 16/2365; G06F 16/243; G06F 16/24553
USPC ......................................................... 707/706
See application file for complete search history.

(56) References Cited

U.S. PATENT DOCUMENTS

| | | | |
|---|---|---|---|
| 6,757,837 B1 | 6/2004 | Platt et al. | |
| 7,055,062 B2 | 5/2006 | Shah et al. | |
| 9,589,049 B1 | 3/2017 | Carrier et al. | |
| 10,083,213 B1* | 9/2018 | Podgorny | G06F 16/3329 |
| 10,127,274 B2* | 11/2018 | Moreno | G06F 16/24522 |
| 2006/0200353 A1* | 9/2006 | Bennett | G06F 16/951 704/270.1 |

(Continued)

OTHER PUBLICATIONS

Salveter et al., "Natural Language Database Updates", Proceedings of the 20th annual meeting on Association for Computational Linguistics, Jun. 16-18, 1982, pp. 67-73.

(Continued)

*Primary Examiner* — James Trujillo
*Assistant Examiner* — Fariborz Khoshnoodi
(74) *Attorney, Agent, or Firm* — Donald J. O'Brien

(57) ABSTRACT

Embodiments are disclosed for correcting a natural language interface database (NLIDB) system. The techniques include receiving feedback indicating that an answer provided in response to a question for an NLIDB system is inaccurate. The techniques further include finding an ontology element for a datastore of the NLIDB system that matches to the feedback. The techniques also include selecting candidate annotations for the NLIDB system based on the ontology element and a data type of the ontology element. Additionally, the techniques include generating a question-answer (QA) pair for each of the candidate annotations. Further, the techniques include adding one of the candidate annotations to annotations for a natural language query (NLQ) engine of the NLIDB system based on a client verification of the QA pair.

20 Claims, 9 Drawing Sheets

(56) References Cited

U.S. PATENT DOCUMENTS

| | | | | |
|---|---|---|---|---|
| 2011/0125734 | A1* | 5/2011 | Duboue | G09B 7/00 707/723 |
| 2016/0042275 | A1* | 2/2016 | Dettman | G06N 5/003 706/46 |
| 2016/0048514 | A1* | 2/2016 | Allen | G06F 16/24522 707/731 |
| 2016/0098477 | A1* | 4/2016 | Berajawala | G06F 3/0482 707/727 |
| 2017/0052976 | A1* | 2/2017 | Verma | G06F 16/24535 |
| 2017/0192976 | A1* | 7/2017 | Bhatia | G06F 16/24522 |
| 2018/0032514 | A1 | 2/2018 | Venkataraman et al. | |
| 2019/0065576 | A1* | 2/2019 | Peng | G06F 16/22 |
| 2020/0042642 | A1* | 2/2020 | Bakis | G06F 16/243 |
| 2020/0134032 | A1* | 4/2020 | Lin | G06F 16/24522 |

OTHER PUBLICATIONS

Minock, M., "Natural Language Updates to Databases Through Dialogue", Proceedings of the 11th International Conference on Applications of Natural Language to Information Systems, May 31-Jun. 2, 2006, 6 pages.

Ribeiro et al., ""Why Should I Trust You?" Explaining the Predictions of Any Classifier", Proceedings of the 22nd ACM SIGKDD International Conference on Knowledge Discovery and Data Mining, Aug. 13-17, 2016, 10 pages.

Nguyen et al., "SemFix: Program Repair via Semantic Analysis", Proceedings of the 2013 International Conference on Software Engineering, May 18- 26, 2013, pp. 772-781.

Zhang et al., "Improve-QA: An Interactive Mechanism for RDF Question/Answering Systems", SIGMOD'18, Jun. 10-15, 2018, pp. 1753-1756.

Mell et al., "The NIST Definition of Cloud Computing", Recommendations of the National Institute of Standards and Technology, Sep. 2011, 7 pages.

* cited by examiner

100

NATURAL LANGUAGE INTERFACE DATABASES

BACKGROUND

The present invention relates to natural language interfaces to databases, and more specifically, to correcting natural language interfaces to databases.

A natural language interface to database (NLIDB) system is a computerized question and answer (QA) system that answers questions that are specified in a natural language, e.g., spoken English. NLIDB systems can translate natural language questions into a technical language that a computer can use to retrieve information stored electronically, such as in an online database. NLIDB systems can thus provide answers to various types of questions based on the resources available to a computer hosting the NLIDB system. For example, smart speakers can provide answers to questions about various topics, including news, art, and history, as just a few examples.

SUMMARY

Embodiments are disclosed for correcting a natural language interface to database (NLIDB) system. The techniques include receiving feedback indicating that an answer provided in response to a question for an NLIDB system is inaccurate. The techniques further include finding an ontology element for a datastore of the NLIDB system that matches to the feedback. The techniques also include selecting candidate annotations for the NLIDB system based on the ontology element and a data type of the ontology element. Additionally, the techniques include generating a question-answer (QA) pair for each of the candidate annotations. Further, the techniques include adding one of the candidate annotations to annotations for a natural language query (NLQ) engine of the NLIDB system based on a client verification of the QA pair.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, are provided to explain the principles of the disclosure. The drawings are only illustrative of certain embodiments and do not limit the disclosure.

Figure 1:
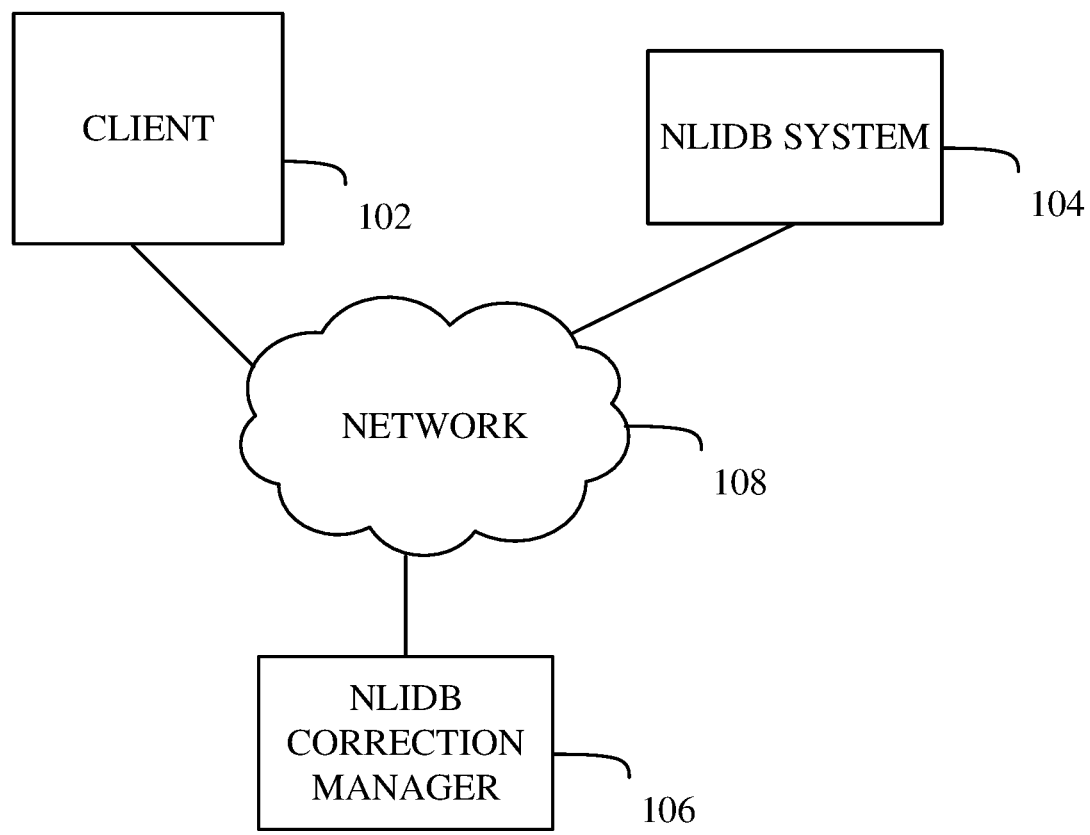
FIG. 1 illustrates a block diagram of an example NLIDB correction system with limited user feedback, in accordance with embodiments of the present disclosure.

While the present disclosure is amenable to various modifications and alternative forms, specifics thereof have been shown by way of example in the drawings and will be described in detail. It should be understood, however, that the intention is not to limit the present disclosure to the specific embodiments described. On the contrary, the intention is to cover all modifications, equivalents, and alternatives falling within the spirit and scope of the present disclosure.

DETAILED DESCRIPTION

In some cases, an NLIDB system can provide inaccurate answers to natural language questions. There can be various reasons for the inaccurate answers. One reason for an inaccurate answer can be that the NLIDB system performs a partial interpretation. A partial interpretation can occur when the NLIDB system fails to interpret one or more parts of the question. For example, if the natural language question is, "Show me the number of stocks that the chief executive officer (CEO) of Company A has held per month for the previous eight years," the NLIDB system may not recognize the word, "per," in the phrase, "per month," and thus fails to calculate the monthly totals. Accordingly, the NLIDB system can respond with an answer that instead lists the stock holdings per year, thus providing an incorrect response.

Another reason for inaccurate answers can be noisy data. Noisy data refers to errors in the electronically stored data used to answer the question. For example, a database might be out of date, and include an erroneous entry. For example, the database might indicate that a CEO works for company B instead of company A. Additionally, technical considerations in how the questions are interpreted, and how data is retrieved can result in inaccurate answers.

Current NLIDB systems can attempt to resolve issues with inaccurate answers in a general fashion through a process known as enrichment. Enrichment is a periodic process whereby the source of the electronically stored data is updated with more current information. While enrichment can help resolve inaccuracies by attrition, enrichment does not correct inaccuracies as they occur. Further, enrichment can involve additions to the data and/or modifications. In this way, enrichment can correct inaccurate answers that are caused by stale data. However, in some cases, correcting inaccuracies can involve deleting data, which enrichment may not address.

Another challenge with correcting inaccuracies in NLIDB systems is a lack of technical expertise at the point in time when inaccuracies occur. While the person asking the question may have enough expertise to identify an inaccurate answer, this person may not have the technical expertise for correcting the NLIDB system.

Accordingly, in embodiments of the present disclosure, NLIDB system users can ask questions, and when the NLIDB system provides an inaccurate answer, the NLIDB system users can provide feedback to help correct issues with the NLIDB system that can contribute to the inaccuracy.

Referring now to FIG. 1, illustrated is a block diagram of an example NLIDB correction system 100 with limited user feedback, in accordance with embodiments of the present disclosure. The system 100 can include a client 102, an NLIDB system 104, and an NLIDB correction manager 106, connected, or otherwise communicating, over a network 108. The client 102 can be a computer system, such as a smart speaker, mobile computing device, desktop computer, laptop computer, tablet, and the like. The client 102 can provide input to the NLIDB system 104 and the NLIDB correction manager 106. Input to the NLIDB system 104 can be in the form of natural language questions to which the NLIDB system 104 can provide answers. The questions can be of a general or specific nature, depending on the implementation of the NLIDB system 104. For example, the questions can relate to trivia, news, business, politics, the arts, science, nature, weather, and the like. The NLIDB system 104 can be a computerized system that translates the natural language questions into a technical language that enables a computer to retrieve electronically stored data. For example, the NLIDB system 104 can include a database of information. Accordingly, the NLIDB system can generate an SQL query that corresponds to the asked question. Further, the NLIDB system 104 can execute the SQL request against the database to retrieve a potential answer to the question.

According to embodiments of the present disclosure, the NLIDB system 104 can be a machine learning system, or rule-based. A machine-learning system can include a number of computer applications that learn how to classify information through the repetition of training sessions. In training sessions, machines learn how to classify information by analyzing labeled examples, and repeatedly attempting to classify training examples based on the success or failure of the classifications.

A rule-based system can include a set of predetermined semantic rules that are applied when attempting to classify data. The rules may follow a specific technical format, such as extensible markup language (XML).

The NLIDB correction manager 106 can be a computerized system that takes feedback from the client 102 regarding an inaccurate answer from the NLIDB system 104, determines why the NLIDB system 104 provides the inaccurate answer, and makes a correction to the NLIDB system 104. In this way, the NLIDB correction manager 106 can enable the NLIDB system 104 to provide an accurate response when queried again with a similar question.

The inputs to the NLIDB correction manager 106 can be in the form of feedback from the client 102. If the answer is inaccurate, the client 102 can provide feedback to the NLIDB correction manager 106 that describes the inaccuracy. For example, the client 102 can identify a part of the answer that is inaccurate. Alternatively, the client 102 can identify part of the question that is not provided in the answer. Accordingly, the NLIDB correction manager 106 can determine a correction to the NLIDB system 104 and make the determined correction to the NLIDB system 104. The NLIDB system 104 can further verify a correction with the client 102 before applying the correction to the NLIDB system 104. According to embodiments of the present disclosure, the verification can involve presenting the client 102 with question and answer pairs. The answers can be presented as binary choices (yes-or-no, a-or-b) with which the client 102 can respond. In this way, a lack of technical expertise on the part of the client 102 is not a hindrance to making corrections to the NLIDB system 104.

For example, the client 102 can provide the question, "Who is the CEO of Company A?" The NLIDB system 104 can translate the question to an SQL query, execute the SQL query against one or more databases, and provide the answer, "John Doe is the CEO of Company A." If the answer is inaccurate, the client 102 can provide feedback to the NLIDB correction manager 106, stating, "No, John Doe is not the CEO of Company A. Rather, Jane Q. Public is the CEO of Company A." Alternatively, the client 102 can enable an on-screen selection of the text, "John Doe," in the answer provided, and the entry of the correct answer. In response to the feedback, the NLIDB correction manager 106 can analyze the NLIDB system 104 in light of the feedback, and determine why the NLIDB system 104 provides the inaccurate answer. For example, the NLIDB correction manager 106 can determine the reason for the inaccuracy is noisy data. For example, there can be a missing entry in one of the databases of the NLIDB system 104. Accordingly, the NLIDB correction manager 106 can add the missing entry to the database such that the NLIDB system 104 can provide the correct response to future queries about the CEO of Company A.

It is noted that there can be several reasons why the NLIDB system 104 provides an inaccurate answer besides noisy data. The NLIDB system 104 can also provide inaccurate answers because the tools that the NLIDB system 104 uses to generate the data retrieval language can lack certain configuration parameters. For example, the NLIDB system 104 can include a specific lexicon for translating the natural language question into the technical language being used. If the client 102 asks a question using a word that is not in the NLIDB system's lexicon, the NLIDB system 102 can fail to translate the question correctly. The reasons for inaccurate answers are described in greater detail with respect to FIGS. 2-5.

It is noted that the NLIDB system 104 can include electronically stored data that can be used as the source of the answers to the natural language questions described above. The electronically stored data is referred to herein as a back end datastore, which may take the form of indexed and non-indexed data files, databases, and the like. To aid in the description of embodiments of the present disclosure, an example database is described with reference to FIG. 2.

Figure 2:
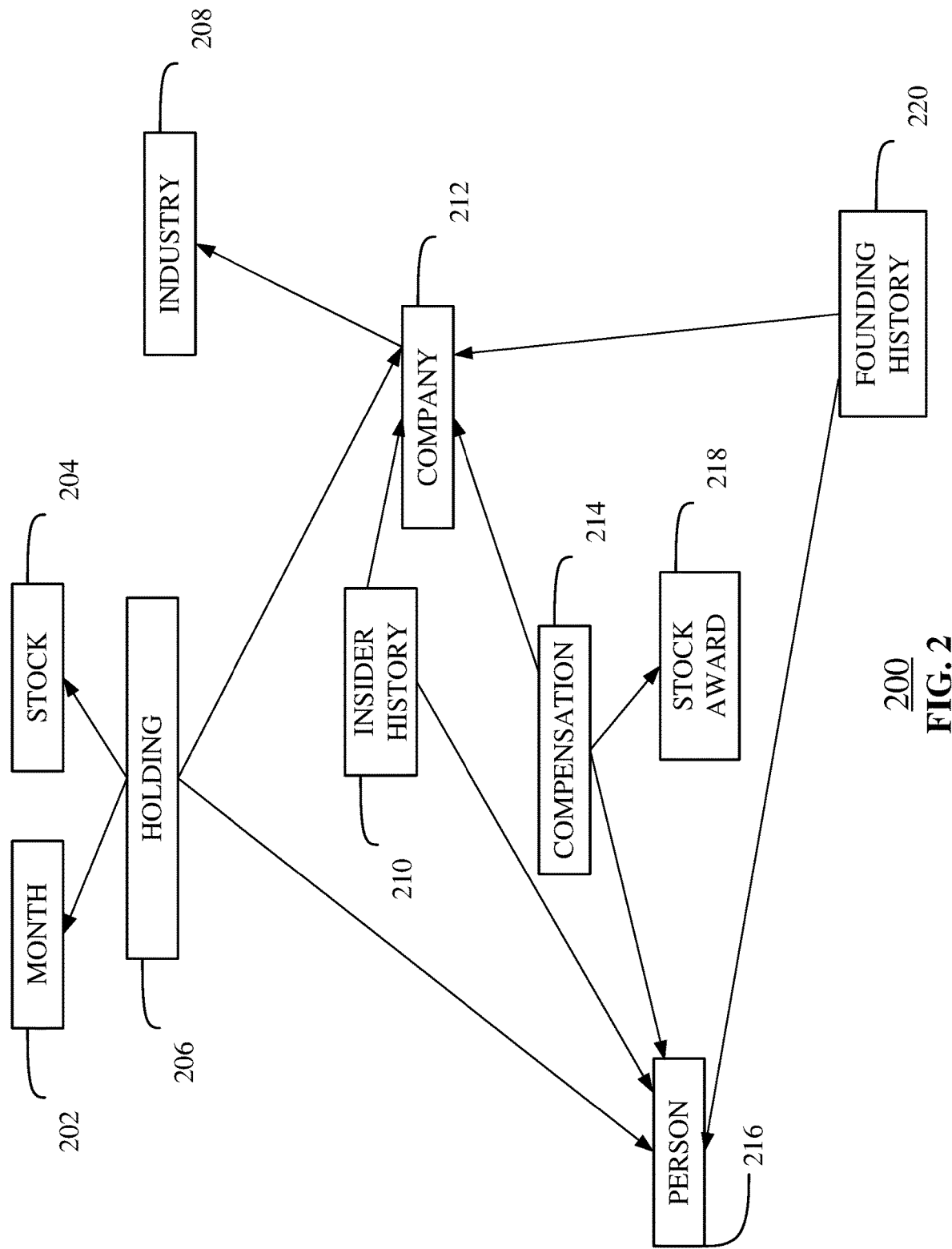
FIG. 2 illustrates a block diagram of a schema of an example database, in accordance with embodiments of the present disclosure.

Referring now to FIG. 2, illustrated is a block diagram of a schema 200 of an example database, in accordance with embodiments of the present disclosure. The example schema 200 includes tables of data relating to compensation and stockholdings of corporate employees. Each table can include related records of information. For example, the example schema 200 includes tables titled month 202, stock 204, and holding 206. Accordingly, the table stock 204 can include records of corporate stocks available for purchase. The table holding 206 can include records of purchased stocks that are now holdings. Further, the table month 202 can include records of each month that a holding 206 is owned. As shown, the example schema 200 also includes tables titled industry 208, insider history 210, company, 212, compensation 214, person 216, stock award 218, and founding history 220. The industry 208 can include records of the various industries to which each company 212 belongs. The insider history 210 can include records of employment for each person 216 at a company 212. The compensation 214 can include records of salary or other payment for each person 216 at a company 212. Further, the founding history 220 can include records describing the start date of a company 212 and the founder. The founder is represented in the relationship from the founding history 220 to the person 216.

The example schema 200 also includes relationships between the tables. The relationships are represented by the arrows pointing from one table to another. The direction of the arrow can indicate a physical path from one table to another. Further, an arrow pointing from a first table to a second table can indicate a one-to-many relationship. Thus, the arrow from holding 206 to month 202 can indicate that a record in the holding 206 can be related to multiple records in the month 202. Such a relationship can indicate that a holding 206 can be held for multiple months. Similarly, the relationship from holding 206 to stock 204 can indicate that a record in the holding 206 can include multiple stocks 204. The relationships from holding 206 to person 216 and company 212 can indicate the name of the person that acquired the stock, and the company that issued the stock, respectively. Additionally, the relationship from compensation 214 to stock award 218 can indicate records of stock awards when the compensation is awarded in stock.

Figure 3:
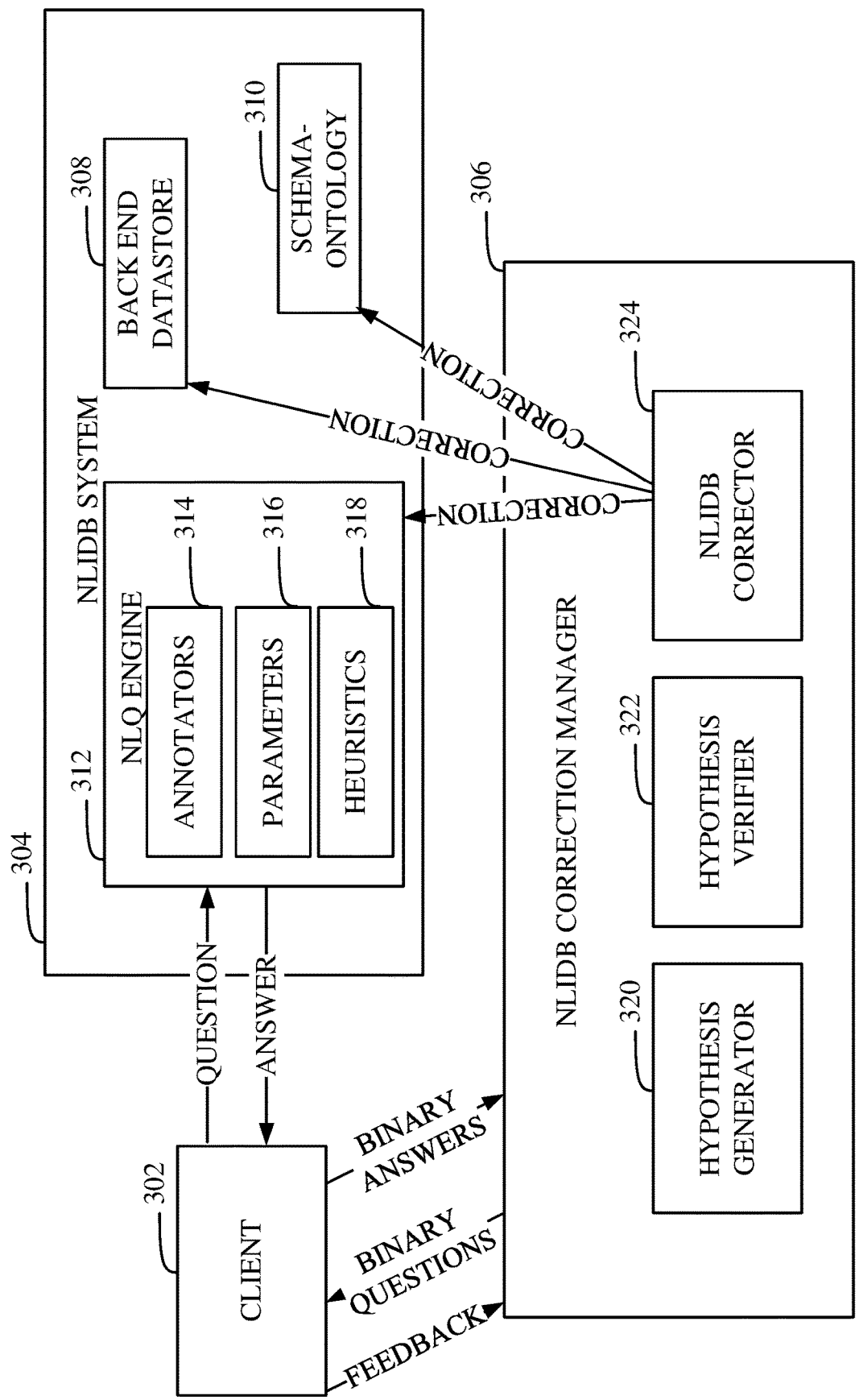
FIG. 3 illustrates a block diagram of an example NLIDB correction system, in accordance with embodiments of the present disclosure

Referring now to FIG. 3, which illustrates a block diagram of an example NLIDB correction system 300, in accordance with embodiments of the present disclosure. The NLIDB correction system 300 includes a client 302, NLIDB system 304, and NLIDB correction manager 306. The client 302, NLIDB system 304, and NLIDB correction manager 306 can be similar to the client 102, NLIDB system 104, and NLIDB correction manager 106, respectively, described with respect to FIG. 1. Further, the NLIDB system 304 can include a back end datastore 308, a schema-ontology 310, and a natural language query (NLQ) engine 312. The back end datastore 308 can store files or databases of information relevant to the questions provided by the client 302. The schema-ontology 310 can be a representation of the back end datastore 308 that defines how the information is organized in storage. For example, the schema-ontology 310 can include a schema, such as the example schema 200 described with respect to FIG. 2. Additionally, the schema-ontology 310 can include an ontology. The ontology can include a mapping between words that can be recited in potential questions to tables in the example schema 200. The words that can be recited in potential questions are also referred to herein as aliases. Thus, the NLQ engine 312 can reference the aliases in the schema-ontology 310 to determine what tables to include in the generated SQL query when translating a question from the client 302.

For example, an ontology for the example schema 200 is shown below:

| TABLE NAME | ALIASES |
| --- | --- |
| MONTH | MONTH |
|  | MO. |
| STOCK | STOCK |
|  | PORTFOLIO |
| HOLDING | STOCKHOLDING |
|  | STOCK PURCHASE |
| INDUSTRY | INDUSTRY |
|  | IND. |
| INSIDER HISTORY | EMPLOYEE |
|  | CEO |
|  | CFO |
|  | CIO |
| COMPANY | COMPANY |
|  | CO. |
|  | CORPORATION |
|  | CORP. |

-continued

| COMPENSATION | COMPENSATION |
| --- | --- |
|  | SALARY |
|  | WAGES |
|  | PAY |
|  | BONUS |
| PERSON | PERSON |
|  | NAME |
|  | WHO |
| STOCK AWARD | STOCK AWARD |
|  | STOCK OPTION |
| FOUNDING HISTORY | HISTORY |
|  | MILESTONE |

Ontology for Example Schema 200

The NLQ engine 312 can include annotators 314, parameters 316, and heuristics 318, that the NLQ engine 312 uses to help interpret the question from the client 302. The annotators 314 can define mappings between potential words within a question to specific query clauses. Such clauses can help organize data, and include, for example, GROUP BY, TOTAL, MAXIMUM, MINIMUM, AVERAGE, ORDER BY, SELECT, and the like. For example, the client 302 can ask the question, "What is the total number of stocks that Executive A holds by month?" In such a case, the NLQ engine 312 can insert a GROUP BY MONTH clause into the SQL query to generate the monthly totals. To enable the NLQ engine 312 to interpret the word, "by," in the question, the annotators 314 can include a mapping from the word, "by," to the GROUP BY clause. The parameters 316 can be database instance values of certain tokens. Tokens can refer to words or symbols in the question. When the token represents an acronym or another potential database value, the parameters 316 can map such tokens to these other potential database values. For example, the question can ask, "When was IBM® founded?" However, instead of the token, "IBM," the database may use the value, "International Business Machines®." Thus, the parameters 316 may map the token, "IBM®," to the value, "International Business Machines®."

The heuristics 318 can represent rankings of interpretations and can be used to resolve ambiguity. For example, the token, "Southwest," can ambiguously mean, "Southwest Airlines," or, "Southwest Securities." Accordingly, the heuristics 318 may be used to choose between the potential values. If the wrong value is chosen, the NLIDB correction manager 306 can correct the heuristics 318 based on feedback from the client 302. In addition to interpreting the question from the client 302 to generate and execute an SQL query against the back end datastore 308, the NLQ engine 312 can provide the answer to the client 302 based on the result of the SQL query execution.

According to embodiments of the present disclosure, if the answer that the NLIDB system 304 provides in response to a question from the client is inaccurate, the client 302 can provide feedback to help correct the NLIDB system 304. The feedback can be answer-related or question-related. Answer-related feedback can identify a specific piece of data that is inaccurate. For example, if the NLQ engine 312 provides the answer, "Executive A," to the question, "Who is the CEO of Company XYZ?"; and, the actual answer is, "Executive B," the client 302 can provide the answer-related feedback, "Executive B," indicating that Executive B is the CEO of Company XYZ. Question-related feedback can specify a part of the question that the inaccurate answer does not address. For example, if the question asks, "What is the total number of stocks that Executive A holds by month?"; and the answer does not include monthly totals, the client 302 can provide the question-related feedback, "by month," indicating that the monthly totals are not included in the answer.

Inaccurate answers can indicate potential issues for correction in the NLQ engine 312, back end datastore 308, and/or schema-ontology 310. Accordingly, the NLIDB correction manager 306 can use the feedback to make corrections to the NLQ engine 312, back end datastore 308, and/or the schema-ontology 310. More specifically, the NLIDB correction manager 306 includes a hypothesis generator 320, hypothesis verifier 322, and an NLIDB corrector 324. The hypothesis generator 320 can determine possible corrections to the NLIDB system 304 based on the feedback. For example, the hypothesis generator 320 can determine that updating the annotators 314 or the back end datastore 308, or adding an alias to the schema-ontology 310 can help the NLQ engine 312 to generate the correct SQL statement for the asked question, and thus produce an accurate answer. In some cases, the hypothesis generator 320 can determine more than one possible correction. Accordingly, the hypothesis verifier 322 can determine which of the possible corrections to apply by asking the client 302 to verify which of the possible corrections supplies accurate answers. According to embodiments of the present disclosure, the hypothesis verifier 322 can ask questions having binary choices (yes-or-no, a-or-b) with which the client 302 can answer. Accordingly, the NLIDB corrector 324 can apply the determined correction to the NLQ engine 312, back end datastore 308, or the schema-ontology 310.

Figure 4:
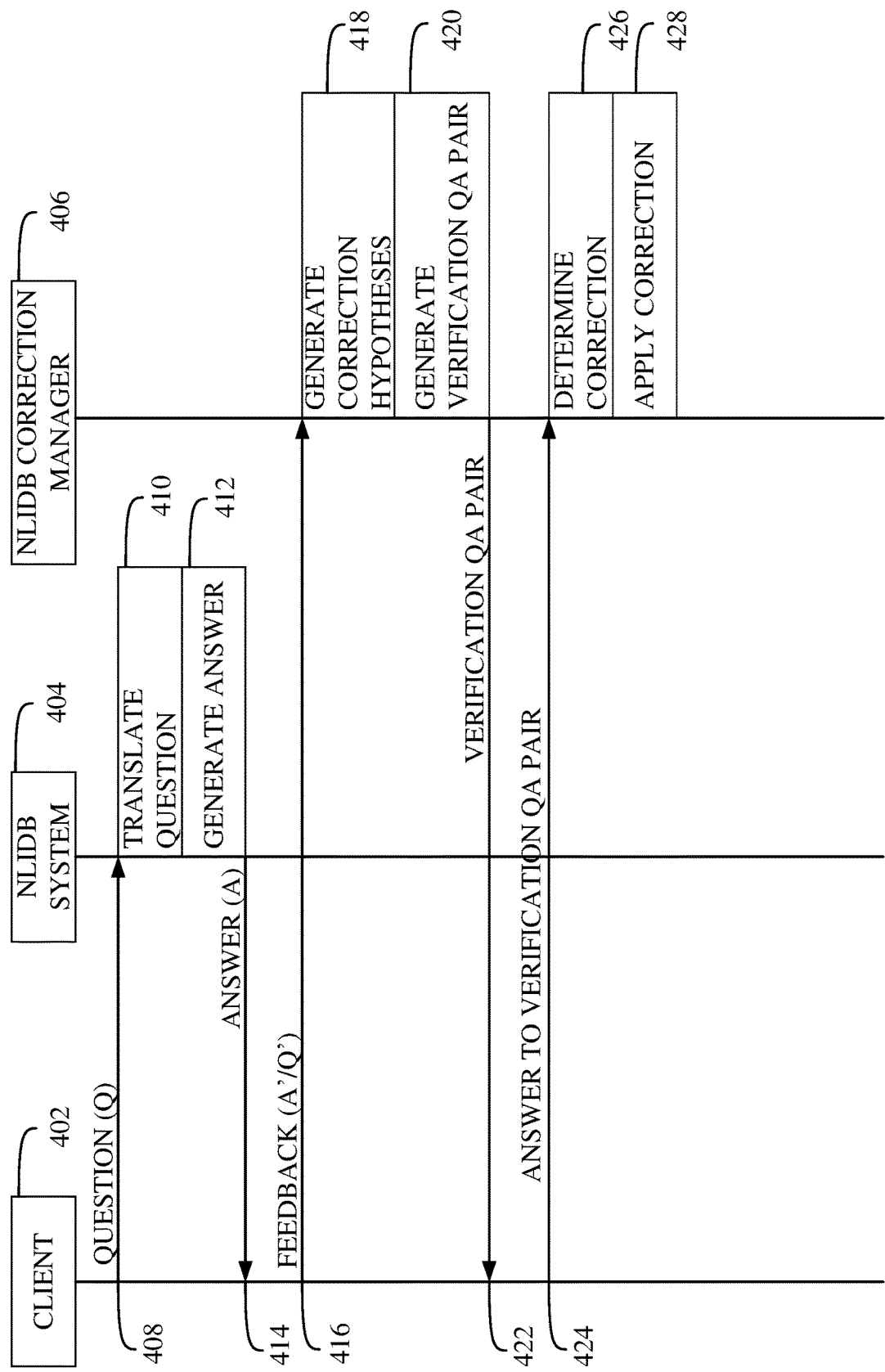
FIG. 4 illustrates a message flow diagram for correcting an NLIDB system based on answer-related feedback, in accordance with embodiments of the present disclosure.

Referring now to FIG. 4, illustrated is a message flow diagram for correcting an NLIDB system based on feedback, in accordance with embodiments of the present disclosure. The feedback may include question-related feedback or answer-related feedback. The message flow diagram includes a client 402, NLIDB system 404, and NLIDB correction manager 406. Message 408 represents a question that the client 402 provides to the NLIDB system 404. For example, the question in message 408 can be, "Which company had John Doe as an executive in the year 2019?"

At block 410, the NLIDB system 404 can translate the question into an SQL query that searches the tables for person 216, compensation 214, and company 212. At block 412, the NLIDB system 404 can generate an answer to the question by executing the SQL query against the database. The SQL query can thus generate the answer, "Company ABC," and send the answer, A, to the client 402 in message 414.

However, the correct answer can be, "Company XYZ." As such, the client can provide feedback in message 416 to the NLIDB correction manager 406. The feedback, A', can represent an alternative answer, e.g., "Company XYZ."

At block 418, the NLIDB correction manager 406 can generate one or more correction hypotheses. A correction hypothesis can be a potential solution to the problem that caused the NLIDB system 404 to generate the inaccurate answer. According to embodiments of the present disclosure, the NLIDB correction manager 406 can generate all possible Steiner trees that result from the question. A Steiner tree is a connected subgraph, G', of a graph, G, that includes all the vertices of G and represents a minimum weight. Given a graph G with set of vertices V and a subset of Steiner vertices V', a Steiner tree is computed as a subgraph G' of G, where G' is the minimal weighted tree connecting V'. For query interpretation, the nodes touched by a user question are Steiner nodes V' for which the Steiner tree is to be computed.

Further, the vertices can represent the tables of the example schema 200. In other words, the Steiner trees can represent alternate translations of the question. Thus, in addition to the Steiner tree that represents the original SQL query scanning the person 216, compensation 214, and company 212 tables, the NLIDB correction manager 406 can generate a Steiner tree for an alternate SQL query that scans the person 216, insider history 210, and company 212 tables.

Further, at block 420, the NLIDB correction manager 406 can generate verification question and answer pairs for each of the hypotheses to determine which SQL query produces the accurate answer. The verification question and answer pair can include a similar question with different parameters, and a different answer for each alternative SQL query. Because the alternate SQL queries can represent alternate translations of similar questions, the verification queries can ensure that changing the translation provides accurate answers in the future. In this example, the verification question and answer (QA) pair sent in message 422 can include the following: "Which company had Jane Q. Public as an executive in 2017? Company DEF or Company UVW?"

The client 402 can provide the answer to the verification QA pair in message 424. Accordingly, at block 426, the NLIDB correction manager 406 can determine the correction to make to the NLIDB system 404 based on the answer to the verification QA pair. Additionally, at block 428, the NLIDB correction manager 406 can apply the correction to the NLIDB system 404.

In this example, the word, "executive," in the original question does not have an alias in the ontology for the example schema 200. Thus, if in the answer to the verification QA pair, the client 402 indicates that the alternate SQL query that scans the insider history 410 table provides the accurate answer, the NLIDB correction manager 406 can determine that the correction involves updating the ontology to include the alias, "executive," for the insider history 410 table.

According to embodiments of the present disclosure, the NLIDB correction manager 406 can provide backward compatibility, meaning that previously asked questions still provide the same accurate answers. Thus, the NLIDB correction manager 406 can cluster a set of previously executed query logs of the NLIDB system 404 to build a representative set of queries covering different patterns. Further, the NLIDB correction manager 406 can run the queries in the representative set against the NLIDB system 404 with the applied correction. If the representative set does not produce the same accurate answers, the backward compatibility test fails, and the NLIDB correction manager 406 can back out the applied correction.

The message flow diagram in FIG. 4 represents a potential flow when the client 402 provides feedback. The feedback may include question-related feedback or answer-related feedback. As stated previously, answer-related feedback can also represent an issue with noisy data in the back end datastore 308. Noisy data can refer to erroneous data. For example, the question in message 408 can be, "Which executive earned the highest stock awards from an airline company?" The NLIDB system 404 can provide the answer, "John Doe," in message 414. However, the accurate answer can instead be, "Jane Q. Public." According to embodiments of the present disclosure, a correction to the data in the database can be indicated if, at block 418, only one correction hypothesis, i.e., Steiner tree, can be generated for the original question. Accordingly, at block 418, the NLIDB correction manager 406 can instead generate a correction hypothesis for each potential correction to the back end datastore 308. Further, the NLIDB correction manager 406 can assign a confidence score to each potential correction hypothesis based on the number of create, update, and delete operations that are involved in the correction. The lower the confidence score, the more likely that the correction hypothesis is the solution. Thus, at block 420, the NLIDB correction manger 406 can generate verification QA pairs for the correction hypothesis with the lowest confidence score. If multiple correction hypotheses have a lowest score, the verification QA pairs can be used to distinguish one of the hypotheses as the higher confidence hypothesis.

The verification QA pairs generated at block 420 for a correction to noisy data can be generated based on the path in the database that leads to the accurate answer. The path can be represented by the table and data in the table. Thus, one possible path for the above example can be: person-John Doe→company-ABC→industry-Airline, which represents the "John Doe" record in the person 216 table, the related "Company ABC" record in the company 212 table, and the related "Airline" record in the industry 208 table. The path for the accurate answer to the question can be: person-Jane Q. Public→company-XYZ→industry-Automotive. Accordingly, the verification QA pair can include: "Is Company XYZ in the airline industry?" If the answer is yes, the NLIDB correction manager 406 can change the relationship from the "Company XYZ" record in the company 212 table to the "Airline" record in the industry 208 table. If the answer is no, the NLIDB correction manager 406 can generate another verification question, such as, "Did Jane Q. Public receive a stock award from Company ABC?" If the answer is yes, the NLIDB correction manager 406 can replace the "John Doe" record in the person 216 table with the "Jane Q. Public" record.

In another example involving question-related feedback (Q'), the question (Q) that prompts the inaccurate answer can be, "How many stocks has John Doe held per month since 2010?" In this example, the inaccurate answer may not total the stocks by month. Accordingly, Q' can include the term, "per month."

When generating the correction hypotheses for a rule-based NLIDB system 404, the NLIDB correction manager 406 can identify the query to be an aggregation query whether the NLIDB system uses rule-based or machine-learning based classification. Additionally, the NLIDB correction manager 406 can infer possible ways that the token "month" can be accommodated in the query. The GROUPBY clause is a possible candidate. Accordingly, the NLIDB correction manager 406 can identify the token, "per," to be a potential annotator, such as the annotators 314, for the GROUPBY clause.

To generate verification QA pairs for a rule-based NLIDB system 404, the NLIDB correction manager 406 can generate queries that are similar to the question, "How many stocks has John Doe held per month since 2010?" Based on the answers to the verification questions from the client 402, the NLIDB correction manager 406 can confirm if the results that treat the token, "per," as an annotator for the GROUPBY clause are correct or not.

However, when generating the correction hypotheses for a machine-learning based NLIDB system 404, the NLIDB correction manager 406 can identify the candidate features that influenced the result. Additionally, the NLIDB correction manager 406 can augment the identified features derived from the missing, "per month," token to create a set of results that are closer to the accurate answer.

When provided a list of similar QA pairs, the client 102 can select the correct QA pair or assert yes to presented QA pairs. In case of multiple different QA pairs, a selection by the client 102 can help the NLIDB correction manager 406 disambiguate which one has the correct hypothesis. For a single QA pair, the client's assertion of the verification QA pair can help the NLIDB correction manager 406 to identify the hypothesis as correct. For example, to generate verification QA pairs for a machine-learning based NLIDB system 404, the NLIDB correction manager 406 can generate queries that are similar to the question, "How many stocks has John Doe held per month since 2010?" If the client's response to the verification QA pairs indicate the answer to one of the queries is correct, the NLIDB correction manager 406 can add the example to the training set.

Figure 5A:
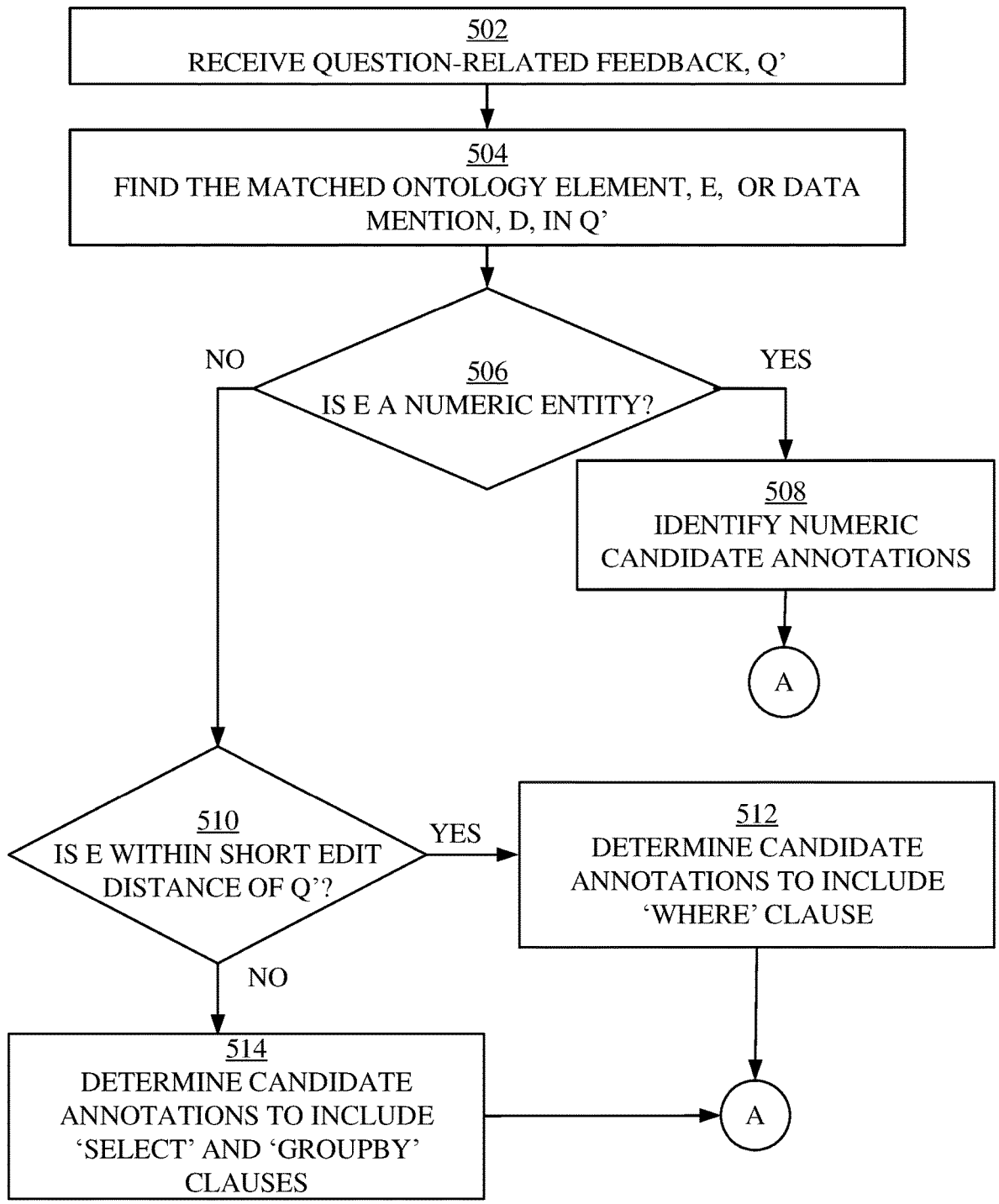
FIGS. 5A-5B illustrate a message flow diagram of a method for correcting an NLIDB system based on question-related feedback, in accordance with embodiments of the present disclosure.
Figure 5B:
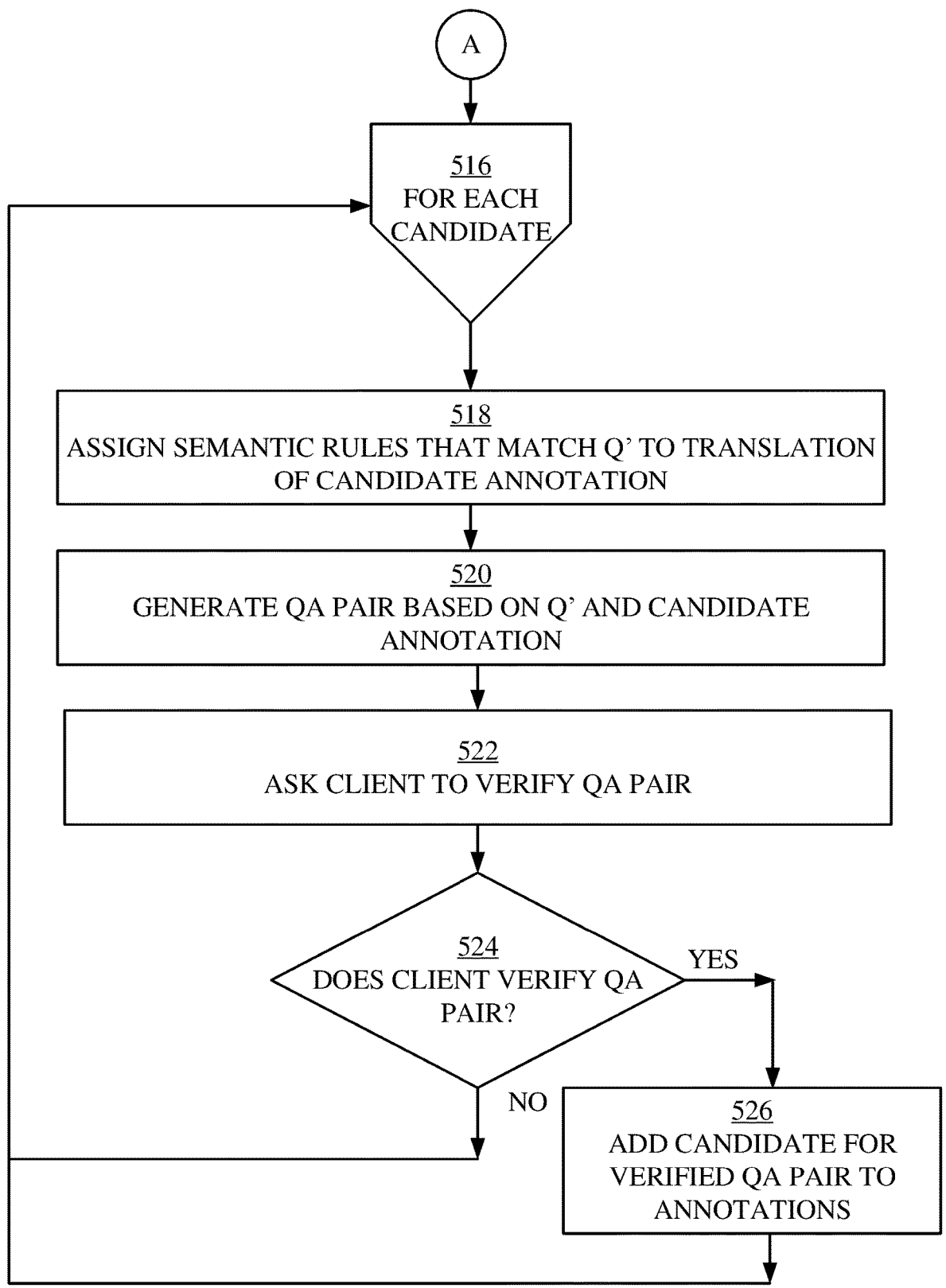

Referring now to FIGS. 5A-5B, illustrated is a message flow diagram of a method 500 for correcting an NLIDB system based on question-related feedback, in accordance with embodiments of the present disclosure. The method 500 can be performed by an NLIDB correction manager, such as the NLIDB correction manager 106 described with respect to FIG. 1. At block 502, the NLIDB correction manager 106 can receive question-related feedback, Q', from a client, such as the client 102 described with respect to FIG. 1. For example, if the question that prompts the inaccurate answer is, "How many stocks has John Doe held per month since 2010?"; and, the inaccurate answer does not total the stocks by month, Q' can include the term, "per month."

At block 504, the NLIDB correction manager 106 can find a matched ontology element, E, for Q' in a schema-ontology, such as the schema-ontology 310. As shown in the ontology for example schema 200, the term, "month," can represent an alias for the table month 202. Alternatively, or additionally, the NLIDB correction manager 106 can find a matched data element, D, for Q' in a schema-ontology, such as the schema-ontology 310. For example, a question, Q', can be, "What is the avg revenue generated by Company A?" In such a question, the token, "avg" may not be recognized as an abbreviation for "average." However, the token, "revenue" can be recognized as a data mention, D, of a "FinancialMetric" column in the database.

Question-related feedback can indicate that correcting the annotations, such as the annotations 314 described with respect to FIG. 3 can resolve the inaccurate answer. In other words, Q' can indicate that an SQL clause was left out of the translated SQL query. Thus, a new annotation 314 can be added to the NLQ engine 312 in association with Q'. In this way, future translations of Q' can include the SQL clause associated with the annotation 314.

However, the potential annotations can be classified as numeric and non-numeric. Accordingly, at block 506, the NLIDB correction manager 106 can determine whether the matched ontology element, E, is a numeric entity. The NLIDB correction manager 106 can determine whether the matched element, month, is a matched entity based on the example schema 200, which can specify the data types for each of the aliases. It is noted that these are only some examples, not an exhaustive list of all the checks that the NLIDB correction manager 106 can make.

If E is a numeric entity, at block 508, the NLIDB correction manager 106 can identify potential candidates for numeric annotations, including, but not limited to, SELECT, SUM, MAX, MIN, AVG, and ORDERBY.

If E is a non-numeric entity, at block 510, the NLIDB correction manager 106 can determine if there is any data instance value in the back end datastore 308 within a short edit distance of Q'. For example, an abbreviation, such as, "EXEC," can be within short edit distance of the alias, "EXECUTIVE."

If Q' is within a short edit distance of a data instance value in the back end datastore 308, at block 512, the NLIDB correction manager 106 can determine the potential candidate annotation to include the WHERE clause.

If Q' is not within a short edit distance of a data instance value in the back end datastore 308, at block 514, the NLIDB correction manager 106 can determine the potential candidate annotation to include the SELECT or GROUPBY clauses.

The NLIDB correction manger 106 can perform blocks 516 through 526 for each candidate annotation. At block 518, the NLIDB correction manager 106 can assign semantic rules that match Q' to the translation of the candidate annotation.

At block 520, the NLIDB correction manager 106 can generate question-answer (QA) pairs using words from Q' and answered with the candidate annotation. In other words, the NLIDB correction manager 106 can translate the original question using the candidate annotation to produce a new answer.

At block 522, the NLIDB correction manager 106 can ask the client 102 to verify the generated QA pair. Thus, the NLIDB correction manager 106 can present the generated QA pair to the client 102, and ask the client if the answer is accurate.

At block 524, the NLIDB correction manager 106 can determine if the client 102 has verified the QA pair. If the client 102 does not verify the QA pair, control of method 500 flows back to block 516. If the client 102 does verify the QA pair, at block 526, the NLIDB correction manager 106 can add the verified candidate annotation to the annotations 314.

Figure 6:
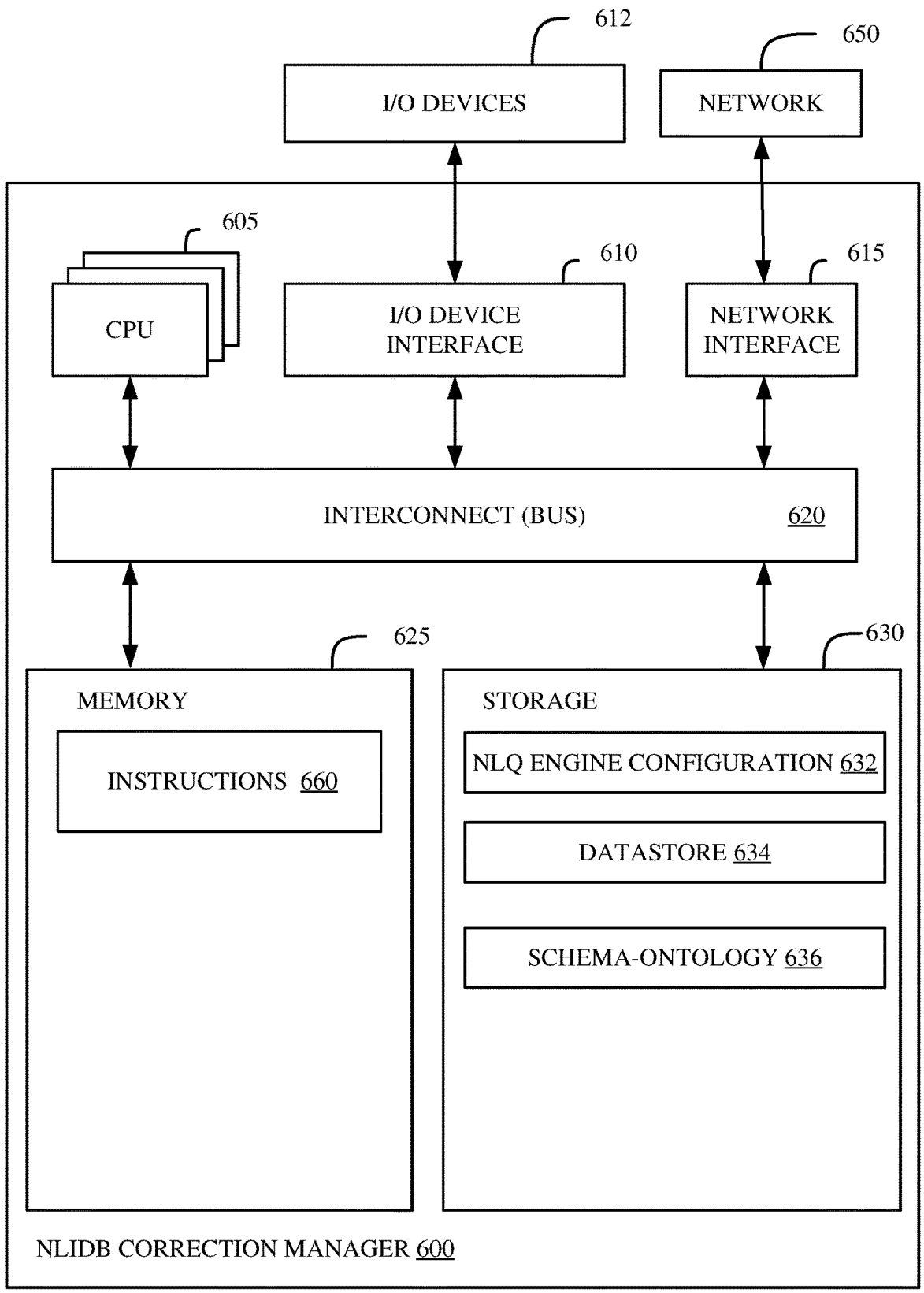
FIG. 6 illustrates a block diagram of an example NLIDB correction manager, in accordance with embodiments of the present disclosure.

Referring now to FIG. 6, illustrated is a block diagram of an example NLIDB correction manager 600, in accordance with embodiments of the present disclosure. In various embodiments, the NLIDB correction manager 600 can perform the method described in FIG. 5 and/or the functionality discussed in FIGS. 1 and 3-5. In some embodiments, the NLIDB correction manager 600 provides instructions for the aforementioned methods and/or functionalities to a client machine such that the client machine executes the method, or a portion of the method, based on the instructions provided by the NLIDB correction manager 600. In some embodiments, the NLIDB correction manager 600 comprises software executing on hardware incorporated into a plurality of devices.

The NLIDB correction manager 600 includes a memory 625, storage 630, an interconnect (e.g., BUS) 620, one or more CPUs 605 (also referred to as processors 605 herein), an I/O device interface 610, I/O devices 612, and a network interface 615.

Each CPU 605 retrieves and executes programming instructions stored in the memory 625 or the storage 630. The interconnect 620 is used to move data, such as programming instructions, between the CPUs 605, I/O device interface 610, storage 630, network interface 615, and memory 625. The interconnect 620 can be implemented using one or more busses. The CPUs 605 can be a single CPU, multiple CPUs, or a single CPU having multiple processing cores in various embodiments. In some embodiments, a CPU 605 can be a digital signal processor (DSP). In some embodiments, CPU 605 includes one or more 2D integrated circuits (3DICs) (e.g., 2D wafer-level packaging (3DWLP), 2D interposer based integration, 2D stacked ICs (3D-SICs), monolithic 2D ICs, 2D heterogeneous integration, 2D system in package (3DSiP), and/or package on package (PoP) CPU configurations). Memory 625 is generally included to be representative of a random access memory (e.g., static random access memory (SRAM), dynamic random access memory (DRAM), or Flash). The storage 630 is generally included to be representative of a non-volatile memory, such as a hard disk drive, solid state device (SSD), removable memory cards, optical storage, and/or flash memory devices. Additionally, the storage 630 can include storage area-network (SAN) devices, the cloud, or other devices connected to the NLIDB correction manager 600 via the I/O device interface 610 or a network 650 via the network interface 615.

In some embodiments, the memory 625 stores instructions 660 and the storage 630 stores an NLQ engine configuration 632, datastore 634, and schema-ontology 636. However, in various embodiments, the instructions 660, NLQ engine configuration 632, datastore 634, and schema-ontology 636 are stored partially in memory 625 and partially in storage 630, or they are stored entirely in memory 625 or entirely in storage 630, or they are accessed over a network 650 via the network interface 615.

Instructions 660 can be processor-executable instructions for performing any portion of, or all, any of the method of FIG. 5 and/or any of the functionality discussed in FIGS. 1, 3, and 4.

The NLQ engine configuration 632 can include annotations, internal parameters, and heuristics (such as the annotation 314, internal parameters 316, and heuristics 318 described with respect to FIG. 3) that the NLIDB correction manager 600 can use to translate questions to a data query language. The datastore 634 can include the source data that an the NLIDB system 102 can use to answer questions posed by the client 102, such as the back end datastore 308 described with respect to FIG. 3. Additionally, the NLIDB correction manager 106 can make corrections to data in the datastore 634 based on answer-related feedback provided by the client 102. Further, the schema-ontology 636 can include a list of aliases for the schema of the datastore 634, such as the schema-ontology 310 described with respect to FIG. 3. The NLIDB correction manager 600 can update the schema-ontology 636 based on answer-related feedback from the client 102.

In various embodiments, the I/O devices 612 include an interface capable of presenting information and receiving input. For example, I/O devices 612 can present information to a user interacting with NLIDB correction manager 600 and receive input from the user.

NLIDB correction manager 600 is connected to the network 650 via the network interface 615. Network 650 can comprise a physical, wireless, cellular, or different network.

In some embodiments, the NLIDB correction manager 600 can be a multi-user mainframe computer system, a single-user system, or a server computer or similar device that has little or no direct user interface but receives requests from other computer systems (clients). Further, in some embodiments, the NLIDB correction manager 600 can be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary NLIDB correction manager 600. In some embodiments, however, individual components can have greater or lesser complexity than as represented in FIG. 6, components other than or in addition to those shown in FIG. 6 can be present, and the number, type, and configuration of such components can vary.

Although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
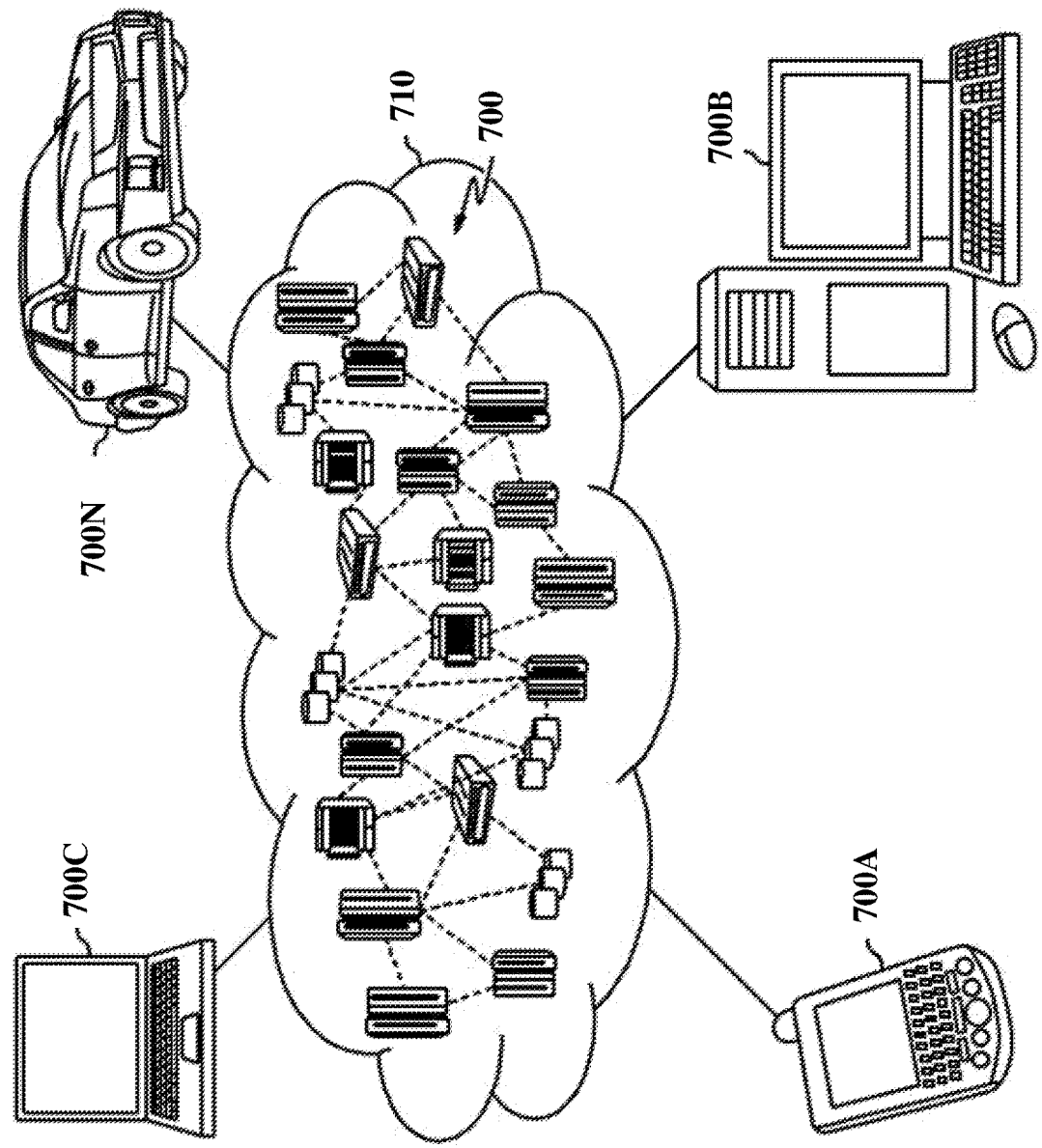
FIG. 7 depicts a cloud computing environment, according to some embodiments of the present disclosure.

Referring now to FIG. 7, which depicts a cloud computing environment 710, according to some embodiments of the present disclosure. As shown, cloud computing environment 710 includes one or more cloud computing nodes 700. The cloud computing nodes 700 can perform the method described in FIG. 5 and/or the functionality discussed in FIGS. 1, 3, and 4. Additionally, cloud computing nodes 700 can communicate with local computing devices used by cloud consumers, such as, for example, personal digital assistant (PDA) or cellular telephone 700A, desktop computer 700B, laptop computer 700C, and/or automobile computer system 700N. Further, the cloud computing nodes 700 can communicate with one another. The cloud computing nodes 700 can also be grouped (not shown) physically or virtually, in one or more networks, such as Private, Community, Public, or Hybrid clouds as described hereinabove, or a combination thereof. This allows cloud computing environment 710 to offer infrastructure, platforms and/or software as services for which a cloud consumer does not need to maintain resources on a local computing device. It is understood that the types of computing devices 700A-N shown in FIG. 7 are intended to be illustrative only and that computing nodes 700 and cloud computing environment 710 can communicate with any type of computerized device over any type of network and/or network addressable connection (e.g., using a web browser).

Figure 8:
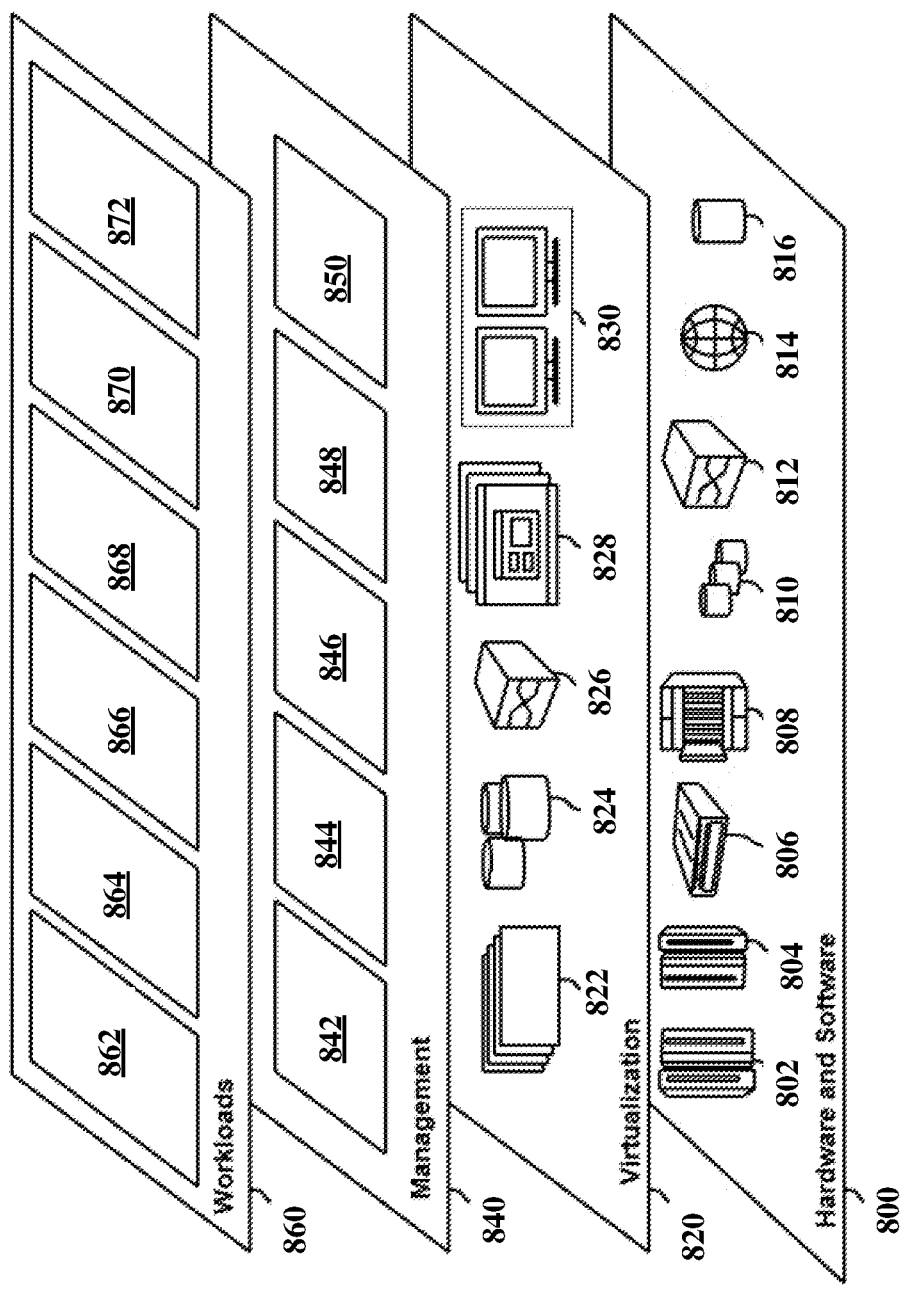
FIG. 8 depicts abstraction model layers, according to some embodiments of the present disclosure.

Referring now to FIG. 8, which depicts abstraction model layers provided by cloud computing environment 710 (FIG. 7), according to some embodiments of the present disclosure. It should be understood in advance that the components, layers, and functions shown in FIG. 8 are intended to be illustrative only and embodiments of the disclosure are not limited thereto. As depicted below, the following layers and corresponding functions are provided.

Hardware and software layer 800 includes hardware and software components. Examples of hardware components include: mainframes 802; RISC (Reduced Instruction Set Computer) architecture based servers 804; servers 806; blade servers 808; storage devices 810; and networks and networking components 812. In some embodiments, software components include network application server software 814 and database software 816.

Virtualization layer 820 provides an abstraction layer from which the following examples of virtual entities can be provided: virtual servers 822; virtual storage 824; virtual networks 826, including virtual private networks; virtual applications and operating systems 828; and virtual clients 830.

In one example, management layer 840 can provide the functions described below. Resource provisioning 842 provides dynamic procurement of computing resources and other resources that are utilized to perform tasks within the cloud computing environment. Metering and Pricing 844 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 846 provides access to the cloud computing environment for consumers and system administrators. Service level management 848 provides cloud computing resource allocation and management such that required service levels are met. Service level management 848 can allocate suitable processing power and memory to process static sensor data. Service Level Agreement (SLA) planning and fulfillment 850 provide pre-arrangement for, and procurement of, cloud computing resources for which a future requirement is anticipated in accordance with an SLA.

Workloads layer 860 provides examples of functionality for which the cloud computing environment can be utilized. Examples of workloads and functions which can be provided from this layer include: mapping and navigation 862; software development and lifecycle management 864; virtual classroom education delivery 866; data analytics processing 868; transaction processing 870; and NLIDB correction manager 872.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising:
   receiving feedback indicating an old answer provided in response to a question for a natural language interface database (NLIDB) system is inaccurate, wherein the NLIDB:
      generates the old answer using an old structured query language (SQL) query; and
      generates the old SQL query based on an old question;
   finding an ontology element for a datastore of the NLIDB system that matches to the feedback indicating the old answer is inaccurate;
   selecting a plurality of candidate annotations for the NLIDB system based on the ontology element and a data type of the ontology element;
   generating a question-answer (QA) pair for each of the candidate annotations;
   adding one of the candidate annotations to a plurality of annotations for a natural language query (NLQ) engine of the NLIDB system based on a client verification of the QA pair;
   generating a new structured query language (SQL) query for the question based on one of the QA-pairs, and the one candidate annotation; and
   generating a new answer for the question that is more accurate than the old answer by executing the new SQL query.

2. The method of claim 1, wherein the ontology element comprises an alias that maps a word of the question to a table of the datastore.

3. The method of claim 1, wherein the feedback indicating the old answer is inaccurate indicates a portion of the question.

4. The method of claim 1, wherein the data type is numeric, and wherein the candidate annotations comprise SELECT, SUM, MAX, MIN, AVERAGE, and ORDERBY clauses.

5. The method of claim 1, wherein the data type is not numeric, and wherein the feedback indicating the old answer is inaccurate is within a short edit distance of a data instance value in the datastore, and wherein the candidate annotation comprises a WHERE clause.

6. The method of claim 1, wherein the data type is not numeric, and wherein the feedback indicating the old answer is inaccurate is not within a short edit distance of a data instance value in the datastore, and wherein the candidate annotations comprise SELECT and GROUPBY clauses.

7. The method of claim 1, wherein the NLQ engine is a machine-learning system.

8. The method of claim 1, wherein the NLQ engine is a rule-based system.

9. A computer program product comprising program instructions stored on a computer readable storage medium, wherein the computer readable storage medium is not a transitory signal per se, the program instructions executable by a processor to cause the processor to perform a method comprising:
receiving feedback indicating an old answer provided in response to a question for a natural language interface database (NLIDB) system is inaccurate, wherein the NLIDB:
generates the old answer using an old structured query language (SQL) query; and
generates the old SQL query based on an old question;
finding an ontology element for a datastore of the NLIDB system that matches to the received feedback indicating the old answer is inaccurate;
selecting a plurality of candidate annotations for the NLIDB system based on the ontology element and a data type of the ontology element;
generating a question-answer (QA) pair for each of the candidate annotations;
adding one of the candidate annotations to a plurality of annotations for a natural language query (NLQ) engine of the NLIDB system based on a client verification of the QA pair;
generating a new structured query language (SQL) query for the question based on one of the QA-pairs, and the one candidate annotation; and
generating a new answer for the question that is more accurate than the old answer by executing the new SQL query.

10. The computer program product of claim 9, wherein the ontology element comprises an alias that maps a word of the question to a table of the datastore.

11. The computer program product of claim 9, wherein the feedback indicating the old answer is inaccurate further indicates a portion of the question.

12. The computer program product of claim 9, wherein the data type is numeric, and wherein the candidate annotations comprise SELECT, SUM, MAX, MIN, AVERAGE, and ORDERBY clauses.

13. The computer program product of claim 9, wherein the data type is not numeric, and wherein the feedback indicating the old answer is inaccurate is within a short edit distance of a data instance value in the datastore, and wherein the candidate annotation comprises a WHERE clause.

14. The computer program product of claim 9, wherein the data type is not numeric, and wherein the feedback indicating the old answer is inaccurate is not within a short edit distance of a data instance value in the datastore, and wherein the candidate annotations comprise SELECT and GROUPBY clauses.

15. A system comprising:
a computer processing circuit; and
a computer-readable storage medium storing instructions, which, when executed by the computer processing circuit, are configured to cause the computer processing circuit to perform a method comprising:
receiving feedback indicating an old answer provided in response to a question for a natural language interface database (NLIDB) system is inaccurate, wherein the NLIDB:
generates the old answer using an old structured query language (SQL) query; and
generates the old SQL query based on an old question;
finding an ontology element for a datastore of the NLIDB system that matches to the feedback indicating the old answer is inaccurate;
selecting a plurality of candidate annotations for the NLIDB system based on the ontology element and a data type of the ontology element;
generating a question-answer (QA) pair for each of the candidate annotations;
adding one of the candidate annotations to a plurality of annotations for a natural language query (NLQ) engine of the NLIDB system based on a client verification of the QA pair;
generating a new structured query language (SQL) query for the question based on one of the QA-pairs, and the one candidate annotation; and
generating a new answer for the question that is more accurate than the old answer by executing the new SQL query.

16. The system of claim 15, wherein the ontology element comprises an alias that maps a word of the question to a table of the datastore.

17. The system of claim 15, wherein the feedback indicating the old answer is inaccurate further indicates a portion of the question.

18. The system of claim 15, wherein the data type is numeric, and wherein the candidate annotations comprise SELECT, SUM, MAX, MIN, AVERAGE, and ORDERBY clauses.

19. The system of claim 15, wherein the data type is not numeric, and wherein the feedback indicating the old answer is inaccurate is within a short edit distance of a data instance value in the datastore, and wherein the candidate annotation comprises a WHERE clause.

20. The system of claim 15, wherein the data type is not numeric, and wherein the feedback indicating the old answer is inaccurate is not within a short edit distance of a data instance value in the datastore, and wherein the candidate annotations comprise SELECT and GROUPBY clauses.

* * * * *